US012596077B2

(12) United States Patent
Liu et al.

(10) Patent No.: US 12,596,077 B2
(45) Date of Patent: Apr. 7, 2026

(54) PASSIVE CAMERA LENS SMUDGE DETECTION

(71) Applicant: Apple Inc., Cupertino, CA (US)

(72) Inventors: Xiaochun Liu, San Diego, CA (US); Yingjun Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 18/887,531

(22) Filed: Sep. 17, 2024

(65) Prior Publication Data

US 2025/0110059 A1      Apr. 3, 2025

Related U.S. Application Data

(60) Provisional application No. 63/586,723, filed on Sep. 29, 2023.

(51) Int. Cl.
*G06T 7/11* (2017.01)
*G01N 21/88* (2006.01)
*G06T 7/00* (2017.01)

(52) U.S. Cl.
CPC ....... *G01N 21/8851* (2013.01); *G06T 7/0002* (2013.01); *G06T 7/11* (2017.01); *G01N 2021/8887* (2013.01); *G06T 2207/10004* (2013.01)

(58) Field of Classification Search
CPC .................. G01N 21/8851; G01N 2021/8887
USPC ......................................................... 348/128
See application file for complete search history.

(56) References Cited

U.S. PATENT DOCUMENTS

| | | | | |
|---|---|---|---|---|
| 11,194,324 | B2 * | 12/2021 | Kida | B60W 30/00 |
| 11,328,428 | B2 * | 5/2022 | Kahlbaum | G06T 3/4015 |
| 11,508,052 | B2 * | 11/2022 | Gardiner | G06T 7/0002 |
| 11,727,664 | B2 * | 8/2023 | Wang | G06V 10/141 |
| | | | | 382/181 |
| 12,205,340 | B2 * | 1/2025 | Schmitt | G06V 10/82 |
| 12,319,246 | B2 * | 6/2025 | Alismail | G06T 7/11 |
| 2019/0106085 | A1 * | 4/2019 | Bacchus | G02B 27/0006 |

* cited by examiner

*Primary Examiner* — Trang U Tran
(74) *Attorney, Agent, or Firm* — Blank Rome LLP

(57) ABSTRACT

This disclosure relates to devices, systems, and methods for passively determining the probability of the presence of a camera lens smudge on an image capture device, e.g., based on an analysis of images captured by the image capture device (and without the need for any reference images). The techniques include: obtaining an image using an image capture device and identifying and analyzing (e.g., in the form of gradient analysis) the regions of interest (ROIs) in high intensity areas of the image. A probability of the presence of a smudge on the image capture devices may then be determined and outputted to a display using any desired modality. According to some aspects, machine learning (ML)-based models may be used in the performance of the passive camera lens smudge detection techniques disclosed herein. According to other aspects, temporal consistency and/or sensor consistency constraints may also be applied to the smudge detection processes.

20 Claims, 5 Drawing Sheets

200

205
IDENTIFY A REGION OF INTEREST (ROI) OF A HIGH INTENSITY AREA

210
CALCULATE IMAGE GRADIENT FOR THE ROI

220
GRADIENT LARGER THAN A THRESHOLD?

NO

YES

230
EXTRACT SUB-ROI IMAGES FOR ROI

240
ANALYZE CONTRAST MEASURE AS VECTOR FEATURE OF EACH SUB-ROI

250
DETERMINE PROBABILITY OF SMUDGE

PASSIVE CAMERA LENS SMUDGE DETECTION

TECHNICAL FIELD

This disclosure relates generally to the field of digital image processing. More particularly, but not by way of limitation, it relates to techniques for passively detecting camera lens smudge in captured image data.

BACKGROUND

Many modern electronic products have the capability to capture and process image data. For example, laptop computers, tablet computers, smartphones and personal media devices may include cameras to capture image data. Processing image data may also play a critical role in so-called "Mixed Reality" (MR), Augmented Reality (AR) and/or Virtual Reality (VR) headsets, autonomous vehicles, and face identification. Such image capturing devices may also include image editing applications to process the data and evaluate the images. These applications may provide various image editing tools, e.g., to crop and/or rotate image content and/or to alter image content in a specified way, for example, by altering image brightness, color content, sharpness, opacity, and the like.

However, self-diagnostic methods to determine whether an image capture device is in good working condition are currently lacking. For example, image degradation, e.g., as caused by lens "smudges," can occur when oil and/or dust is present on the lens of a device's camera. This smudging may create additional scattering of light rays between the smudge and the first optical layer, which may result in a loss of image quality, such as blurriness, loss of sharpness, etc. As another example, human sweat (or other forms of moisture) forming on a camera's lens may also result in a loss in image quality, which may occur, e.g., if a camera is too close to the user's body during operation or when an operating temperature for a given device changes dramatically from cold to hot.

SUMMARY

In general, embodiments disclosed herein relate to devices and methods for passively identifying camera smudge. The camera smudge may be determined without the use of a reference image. Embodiments also include methods for identifying camera smudge using temporal consistency and/or sensor response consistency constraints.

In one aspect, embodiments relate to a device that includes a display, an image capture device, and one or more processors operatively coupled to memory. The one or more processors are configured to execute instructions causing the one or more processors to obtain an image using the image capture device and identify a region of interest (ROI) in a high intensity area of the image. An image gradient of the ROI is then determined to be greater than a threshold value. The instructions cause the processors to extract a plurality of sub-ROIs for the ROI and determine a probability of a smudge on a lens of the image capture device. The probability of the smudge on the lens of the image capture device is output to the display. The probability of the smudge on the lens of the image capture device may be determined by a contrast measure for each of the plurality of sub-ROIs, or by using convolutional blocks of a neural network for each of the plurality of sub-ROIs.

In another aspect, embodiments are directed to an image processing method that includes obtaining an image using an image capture device and identifying a ROI in a high intensity area of the image. The method includes determining that an image gradient of the ROI is greater than a threshold value and extracting a plurality of sub-ROIs for the ROI. A probability of a smudge on a lens of the image capture device is determined, and the probability of the smudge on the lens of the image capture device is outputted to a display.

In another aspect, embodiments are directed to a system that includes an image capture device, a display, and a smudge detection module. The smudge detection module is configured to obtain an image using the image capture device and identify a ROI in a high intensity area of the image. An image gradient of the ROI is determined to be greater than a threshold value, and a plurality of sub-ROIs is extracted for the ROI. A probability of a smudge a lens of on the image capture device is determined, and the probability of the smudge on the lens of the image capture device is output to the display.

Various electronic devices are disclosed herein, in accordance with the program storage device embodiments disclosed. Such electronic devices may generally comprise a memory, one or more image capture devices (i.e., cameras with lenses), a display, a user interface, and one or more processors operatively coupled to the memory. Instructions may be stored in the memory, the instructions causing the one or more processors to perform methods in accordance with the embodiments enumerated herein.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Smudges on the lens of an image capture device may result from oil or grease on the outer layer of the device, e.g., aligned with the location of a lens of an image capture device embedded in the device. Depending on the lens coating material used, the lens may induce additional scattering in the device, or the material may function as a diffuser, which can blur or cause other adverse effects on images captured by such a lens.

Embodiments disclosed herein provide methods to analyze an input image to passively identify smudges. Embodiments disclosed herein have the added advantage of not needing to rely on additional devices or reference images in order to detect camera lens smudges.

Figure 1:
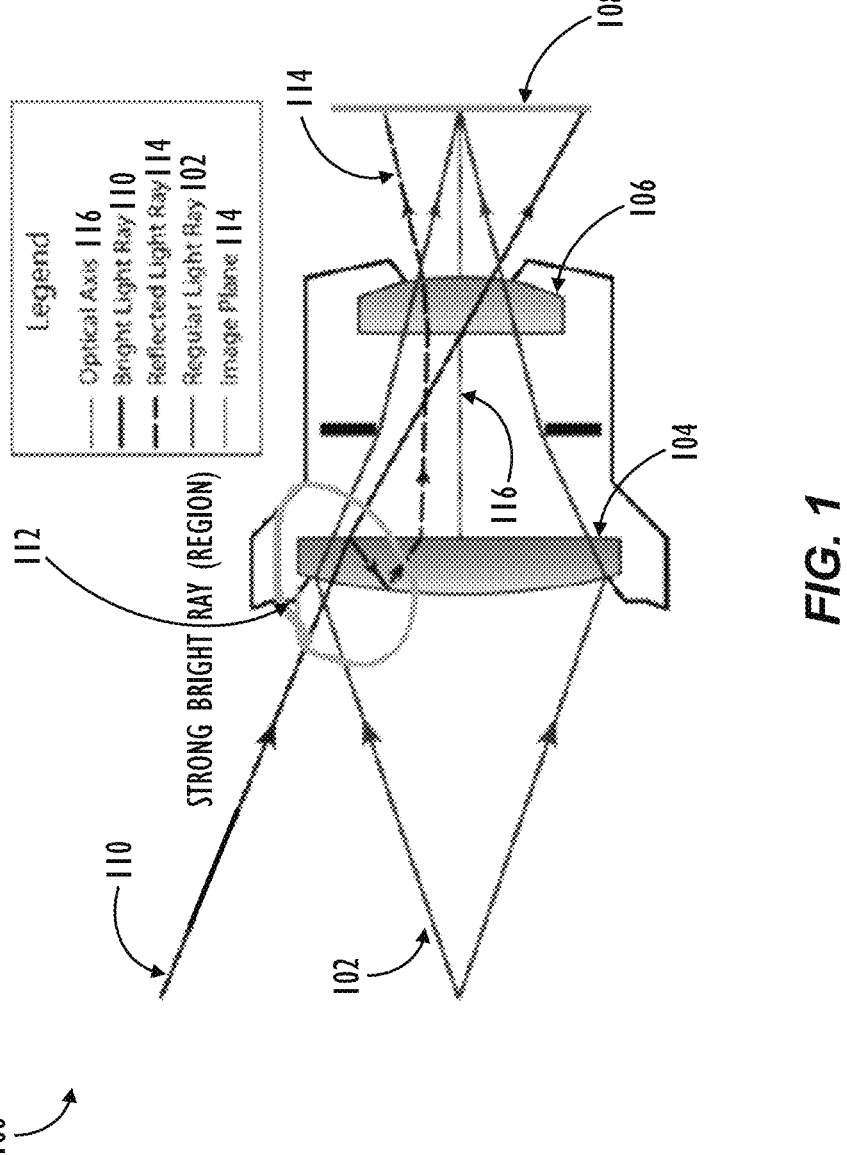
FIG. 1 demonstrates light ray scattering that may occur as the result of a smudge on a lens surface, according to one or more embodiments.

Turning now to FIG. 1, a diagram 100 is shown that demonstrates the light ray scattering that may occur as the result of a smudge on a surface of a lens, according to one or more embodiments. As shown, a regular light wave 102 passes through an outer lens 104 having an optical axis 116, wherein the outer lens 104 focuses the regular light wave 102 through an inner lens 106 to eventually arrive at the image plane 108. Strong or bright light rays, such as light ray 110, for example, emanating from highly reflective objects or passive light sources, may also pass through the outer lens 104 to arrive at the image plane 108.

In accordance with embodiments, if a smudge, or other foreign material (dust, oils, etc.), is present on the outer lens 104, additional scattering 112 may occur at the outer lens 104 with the strong bright rays 110. The additional scattering 112 can result in additional reflected light 114 reaching the image plane 108. Such additional reflected light 114 may have adverse effects on the captured image, such as unnatural blurriness or smearing effects in the captured image. Embodiments disclosed herein facilitate the identification of the adverse effects caused by such additional reflected light 114, and embodiments disclosed herein may further provide a user with an indication that the lens may have a smudge that should be cleaned off by the user.

Embodiments identify situations like that in FIG. 1 by analyzing high intensity areas of the scene captured by the image capture device. That is, embodiments may passively analyze highly reflective objects in the scene to determine if additional scattering is present. Examples of such highly reflective objects may be a passive light source, such as a room light, office light, or street lamp, or high intensity objects, such as reflections from a bright surface, such as a white surface in the scene.

Figure 2:
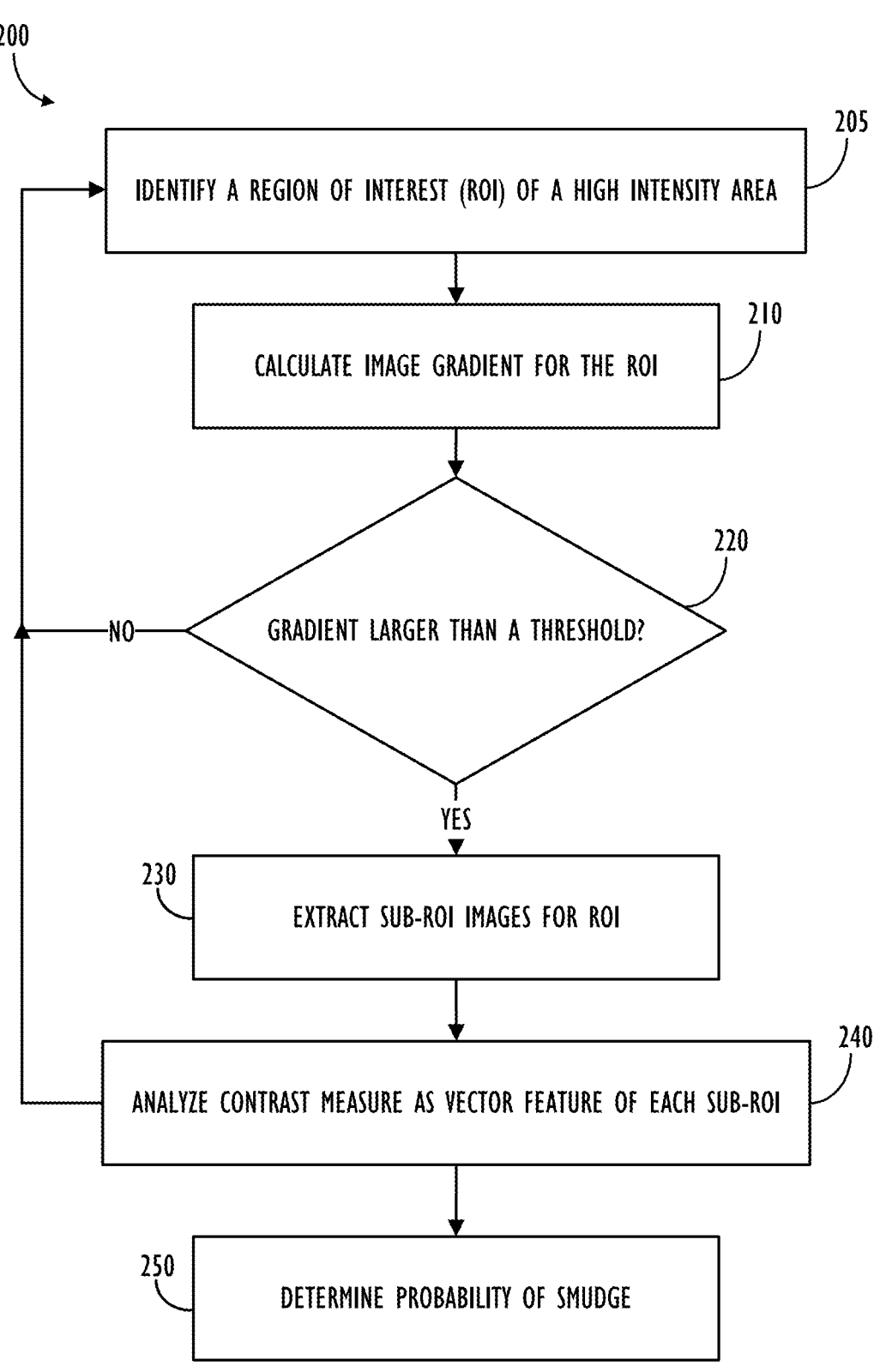
FIG. 2 is an exemplary method of performing passive camera lens smudge detection, according to one or more embodiments.

Turning now to FIG. 2, an exemplary method 200 of performing passive camera lens smudge detection is illustrated, according to one or more embodiments. For illustrative purposes, FIG. 2 provides a simple example for identifying the presence of a smudge in a single still image acquisition, without the need of capturing any additional reference image(s) or utilizing any additional devices to monitor the condition of the lens.

At Step 205, the method 200 may identify a Region of Interest (ROI) in a high intensity area of a captured image. The inventors have discovered that only light rays with high intensity (or high energy) may have an observable "smudging" effect on the captured image. Because the image degradation associated with smudging effects results from light rays bouncing between a smudge material and optical layers of the camera's lens, such reflections cause a loss in those high intensity light rays, which may be observable in the captured image.

Embodiments are generally focused on the analysis of such high intensity areas of captured images because the inventors discovered that using lower intensity areas of the image in a passive lens smudge detection analysis may hinder the ability to provide a robust decision regarding the presence of a smudge. That is, using low intensity areas of an image requires more processing-intensive resources, e.g., a pre-trained neural network, to identify the presence of a smudge. If a smudge occurs in a small portion of a low intensity area, the resources must be robust enough to be able to learn to identify such smudges, which can require a difficult training operation for any such neural network.

Embodiments disclosed herein may determine what is considered high intensity based on the resources available. For example, embodiments of smaller stand-alone devices may require a higher intensity as compared to embodiments with image capture devices connected to more robust resources, like a neural network.

Returning to FIG. 2, in Step 210 an image gradient is calculated for the high intensity ROI identified. At Step 220, if the calculated image gradient exceeds a threshold, sub-ROI images are extracted from the ROI in Step 230. A contrast measure, e.g., in the form of a vector feature, may be analyzed for each of the sub-ROIs in Step 240.

If points in the image gradient are not greater than the threshold (No in Step 220), the process may return to Step 200 to evaluate another high intensity ROI. After Step 240, the process may return to step 205. Steps 205 to 240 may be repeated for each high intensity ROI identified in the captured image.

At Step 250, the probability of a smudge is determined in a region of the image. The probability may be determined as a value between 0 and 1, with a value of 0 representing the lowest probability of there being smudges present on the lens, and a value of 1 representing the highest probability of a smudge being present. The probability may be determined based on a learning scheme previously established, or may be determined in an online decision, such as by a neural network or other form of artificial intelligence.

In accordance with some embodiments herein, the probability is used to determine whether to notify the user that the image capture device may be smudged. Such a notification may take the form of a displayed or spoken message, e.g., "Smudge Detected", "Please Clean the Lens," a haptic response, etc. The notification may also take the form of a symbol or moving image. For example, an icon may be displayed at a specific probability. Embodiments may include a displayed smudge "health" status bar that directly reflects the probability described above of there presently being a smudge on the relevant camera lens of an electronic device. Embodiments may also include combinations of the features described above, such as a displayed icon when the severity/probability of the detected smudge is of a first (i.e., lower) priority, followed by a message if the severity/ probability of the detected smudge increases to a second (i.e., higher) priority.

In some embodiments, the displayed icon, or "health" status bar, may facilitate user interactions. For example, once an icon is displayed (e.g., at a specific probability), a user may interact with the icon (by touching or swiping the icon) to re-evaluate the smudge status as if the lens has been cleaned. If the lens is clean, the icon may disappear or the "health" bar may decrease by a certain percentage based on a detected probability. In other words, the icons or "health" bar on the display may act like as a virtual object or a virtual physical concept that interact with the user in accordance with embodiments herein.

Figure 3:
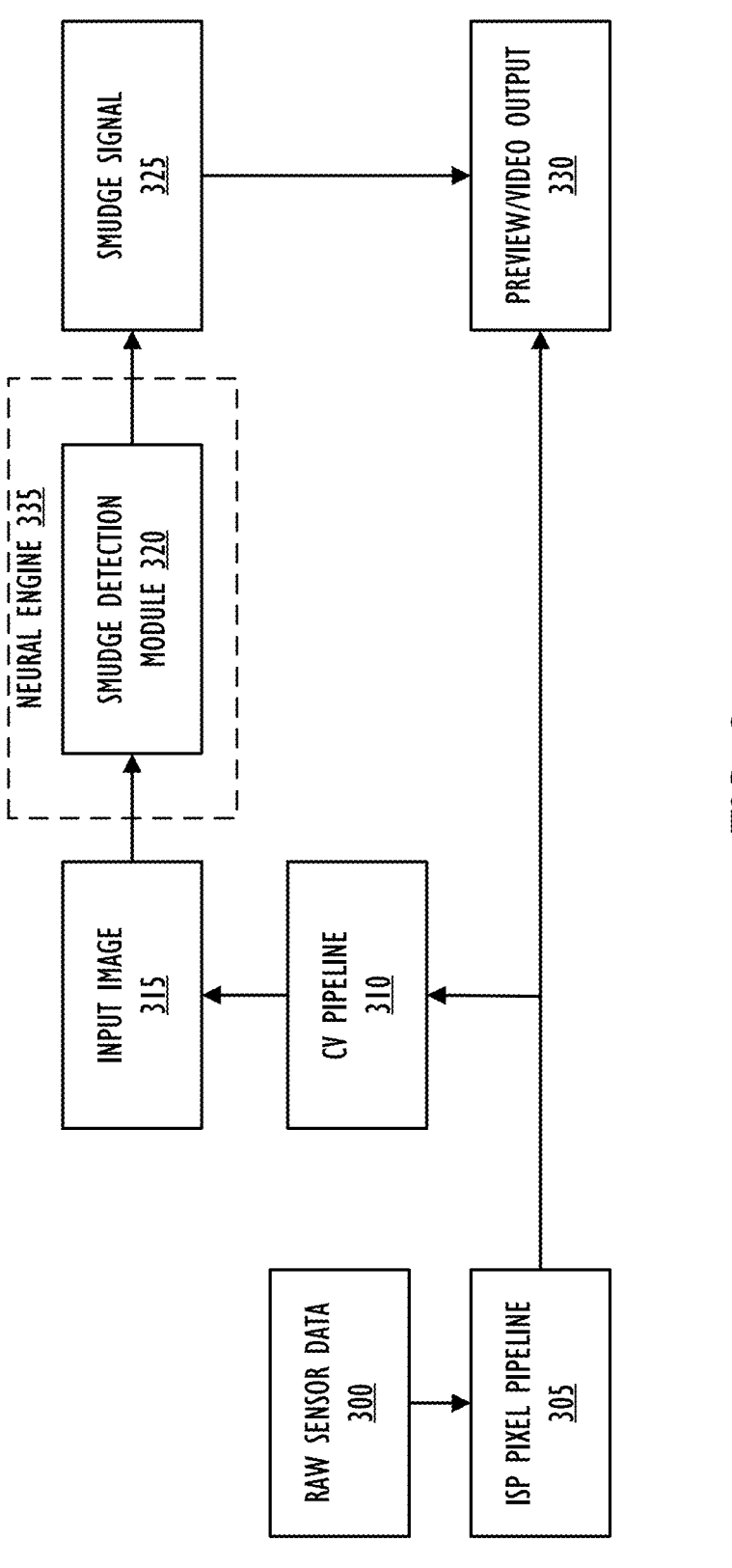
FIG. 3 is a flow chart illustrating a process of performing passive camera lens smudge detection using a machine learning (ML)-based model, according to one or more embodiments.

FIG. 3 is a flow chart illustrating a process of performing passive camera lens smudge detection using a machine learning (ML)-based model, according to one or more embodiments. FIG. 3 demonstrates how the embodiments disclosed herein may be incorporated into current imaging pipelines with minimal impact. This allows for passive smudge evaluation in real-time by an electronic image capture device. Beginning with exemplary RAW image sensor data 300, e.g., as acquired from an image capture device, the RAW image sensor data enters the image signal processor (ISP) pixel pipeline 305. The ISP pixel pipeline 305 provides for a direct preview of the video output 330.

The ISP pixel pipeline 305 also provides pixel information for a computer vision (CV) pipeline 310. The CV pipeline 310 provides the input image 315 to a smudge detection module 320. The smudge detection module 320 may be part of a device that includes the image capture device, similar to the devices that will be described with reference to FIG. 4. In some embodiments, the smudge detection module 320 may be implemented by part of a neural engine 335, e.g., a separate neural network trained to identify high intensity smudged regions in captured images and rely on such regions as indicia of the likely presence of camera smudge in the captured images.

The smudge detection module 320 provides a smudge signal 325, which may be displayed on the preview/video output 330. The smudge signal 325 may take the form of a smudge saliency map (similar to that shown in FIG. 4B). The smudge signal 325 may also take the form of a probability. The smudge detection module 320 provides the smudge signal 325 as described above and in accordance with FIG. 2. Embodiments may use the ISP pixel pipeline to establish the gradient calculation on the fly. This may be considered similar to existing content-aware sharpening blocks that are used in some ISP pipelines. As such, these smudge detection embodiments are highly efficient and may require minimal reprogramming of current hardware.

Embodiments also include methods for identifying camera smudge using temporal consistency constraints. More specifically, embodiments may apply a temporal consistency constraint when analyzing a sub-ROI for the presence of smudges in the pipeline. The temporal consistency constraint may take the form of using a running average of the probability or other parameters, such as the intensity and/or reflectivity, over the course of multiple frames or acquired images.

Although some embodiments disclosed herein are primarily directed to standalone image capture devices, one of ordinary skill in the art will appreciate that embodiments may be further combined with other sensors or image capture devices. For example, a system that includes multiple image capturing devices may detect a certain probability of a smudge in one of the image capture devices. The system may then use multiple sensor consistency as another constraint to help establish a determination of whether any lens smudge is present. The multiple sensor consistency constraint may also include moving one or more of the image capturing devices to establish a potential smudge profile. This may be leveraged further using the temporal constraints described above.

Figure 4A:
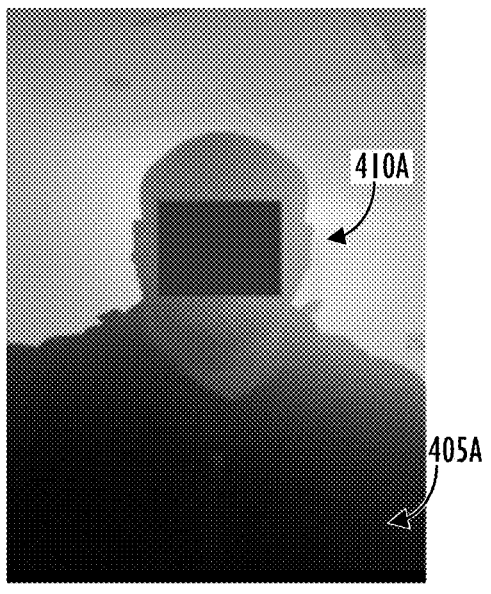
FIGS. 4A and 4B illustrate an exemplary captured image and an exemplary smudge saliency map profile for the exemplary captured image, respectively, according to one or more embodiments.
Figure 4B:
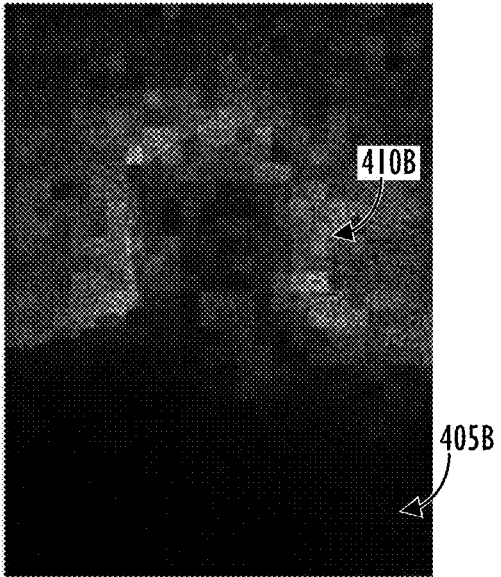

As described above, various embodiments disclosed herein may provide autonomous detection of smudges for smartphones and other electronic devices. Embodiments also have the ability to create a potential smudge profile of a captured image, e.g., in the form of a smudge saliency map. FIGS. 4A and 4B illustrate an exemplary captured image and an exemplary smudge saliency map profile for the exemplary captured image, respectively, according to one or more embodiments. FIG. 4A shows the original image captured by the image capture device, including low intensity areas, such as 405A, as well as high intensity areas, such as 410A. In FIG. 4A, there is a light source behind the human subject in the center of the captured image, which causes the high intensity areas in the captured image, such as 410A. FIG. 4B is an example of a potential smudge profile of the image in FIG. 4A, in the form of a smudge saliency map. As can be seen in FIG. 4B, the high intensity areas in the captured images, such as 410A, have corresponding high intensity regions in the smudge saliency map, such as 410B, which may be used to establish the presence of a potential smudge at such regions in the captured image. Conversely, the low intensity areas in the captured images, such as 405A, have corresponding low intensity regions in the smudge saliency map, such as 405B, which are indicative of the lowest possible probability of the presence of a potential smudge at such regions of the captured image.

Figure 5:
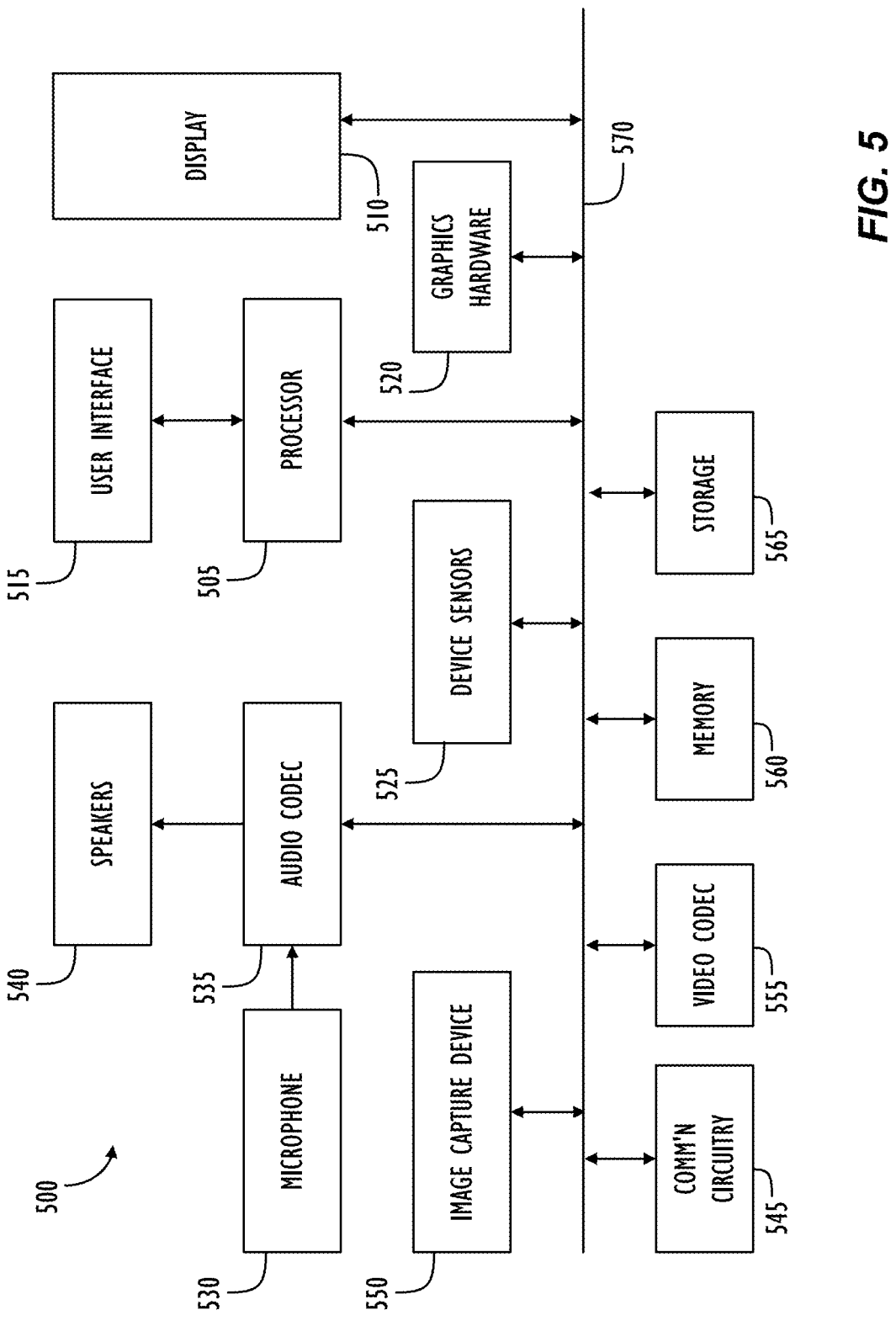
FIG. 5 is a block diagram illustrating an exemplary electronic device, in which one or more of the techniques disclosed herein may be implemented.

FIG. 5 demonstrates a simplified functional block diagram of illustrative programmable electronic device 500 according to one or more embodiments disclosed herein. The electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture device 550, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the passive camera lens smudge detection operations, in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may take a picture or view a captured video stream. The display 510 may display a video stream as it is captured while processor 505 and/or graphics hardware 520 and/or image capture circuitry contemporaneously generate and store the video stream in memory 560 and/or storage 565. Processor 505 may be a system-on-chip such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUS).

Image capture device 550 may comprise one or more camera units configured to capture images, e.g., images which may be evaluated to determine if a smudge is present on the image capture device 550 in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein.

It is to be understood that the above description is intended to be illustrative, and not restrictive. Embodiments have the advantage of autonomously detecting the present of smudges on a lens of an image capturing device. Embodiments may be applied continuously to address the presence of smudges in real time. Embodiments may further be leveraged in systems with multiple image capturing devices to detect smudges.

Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a display;
an image capture device; and
one or more processors operatively coupled to memory, wherein the one or more processors are configured to execute instructions causing the one or more processors to:
obtain an image using the image capture device;
identify a region of interest (ROI) in a high intensity area of the image;
determine an image gradient of the ROI is greater than a threshold value;
extract a plurality of sub-ROIs for the ROI;
determine a probability of a smudge on a lens of the image capture device; and
output the probability of the smudge on the lens of the image capture device to the display.

2. The device of claim 1, wherein the probability of the smudge on the image capture device is determined by a contrast measure for each of the plurality of sub-ROIs.

3. The device of claim 1, wherein the probability of the smudge on the image capture device is determined using convolutional blocks of a neural network for each of the plurality of sub-ROIs.

4. The device of claim 1, further comprising: obtaining a second image using the image capture device, wherein the probability of the smudge on the image capture device is further determined based, at least in part, on an analysis of high intensity areas of the second image.

5. The device of claim 1, wherein the probability is output in the form of a message on the display.

6. The device of claim 1, wherein the probability is output in the form of a status bar on the display.

7. An image processing method, comprising:
obtaining an image using an image capture device;
identifying a region of interest (ROI) in a high intensity area of the image;
determining an image gradient of the ROI is greater than a threshold value;
extracting a plurality of sub-ROIs for the ROI;
determining a probability of a smudge on a lens of the image capture device; and
outputting the probability of the smudge on the lens of the image capture device to a display.

8. The method of claim 7, wherein the probability of the smudge on the image capture device is determined by a contrast measure for each of the plurality of sub-ROIs.

9. The method of claim 7, wherein the probability of the smudge on the image capture device is determined using convolutional blocks of a neural network for each of the plurality of sub-ROIs.

10. The method of claim 7, further comprising: obtaining a second image using the image capture device, wherein the probability of the smudge on the image capture device is further determined based, at least in part, on an analysis of high intensity areas of the second image.

11. The method of claim 7, wherein the probability is output in the form of a message on the display.

12. The method of claim 7, wherein the probability is output in the form of a status bar on the display.

13. A system comprising:
an image capture device;
a display; and
a smudge detection module, wherein the smudge detection module is configured to:
obtain an image using the image capture device;
identify a region of interest (ROI) in a high intensity area of the image;
determine an image gradient of the ROI is greater than a threshold value;
extract a plurality of sub-ROIs for the ROI;
determine a probability of a smudge a lens of on the image capture device; and
output the probability of the smudge on the lens of the image capture device to the display.

14. The system of claim 13, wherein a neural engine comprises the smudge detection module.

15. The system of claim 13, wherein the probability of the smudge on the image capture device is determined by a contrast measure for each of the plurality of sub-ROIs.

16. The system of claim 13, wherein the probability of the smudge on the image capture device is determined using convolutional blocks of a neural network for each of the plurality of sub-ROIs.

17. The system of claim 13, further comprising: obtaining a second image using the image capture device, wherein the probability of the smudge on the image capture device is determined using the second image.

18. The system of claim 13, wherein the probability is output in the form of a message on the display.

19. The system of claim 13, wherein the probability is output in the form of a status bar on the display.

20. The system of claim 13, wherein the smudge detection module is operatively connected to an image signal processing (ISP) pipeline.

* * * * *